US009356715B2

(12) United States Patent
Kummer et al.

(10) Patent No.: US 9,356,715 B2
(45) Date of Patent: May 31, 2016

(54) USER NOTIFICATION OF BROADCAST COMMUNICATION CHANNEL PROBLEMS

(75) Inventors: David A. Kummer, Highlands Ranch, CO (US); Michael T. Dugan, Parker, CO (US); Kranti K. Kilaru, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1728 days.

(21) Appl. No.: 11/693,024

(22) Filed: Mar. 29, 2007

(65) Prior Publication Data

US 2010/0253785 A1 Oct. 7, 2010

(51) Int. Cl.

*H04N 17/00* (2006.01)
*H04N 17/02* (2006.01)
*H04H 20/74* (2008.01)
*H04H 20/12* (2008.01)
*H04H 60/11* (2008.01)

(52) U.S. Cl.

CPC ............... *H04H 20/74* (2013.01); *H04H 20/12* (2013.01); *H04H 60/11* (2013.01)

(58) Field of Classification Search

CPC ........ H04H 20/74; H04H 20/12; H04H 60/11
See application file for complete search history.

(56) References Cited

U.S. PATENT DOCUMENTS 5,881,289 A * 3/1999 Duggan et al. ................ 717/145
6,848,062 B1 * 1/2005 Desai et al. .................... 714/4.1
2002/0108116 A1* 8/2002 Dillon ............................. 725/63
2003/0121047 A1* 6/2003 Watson et al. .................. 725/93
2003/0208777 A1* 11/2003 Danker et al. ................ 725/135
2005/0108759 A1* 5/2005 Arsenault et al. ............... 725/72
2008/0192820 A1* 8/2008 Brooks et al. ............ 375/240.02
2010/0060433 A1* 3/2010 Karabinis .................... 340/10.3

FOREIGN PATENT DOCUMENTS

EP 1047268 A 10/2000
WO 02/43322 A 5/2002
WO 2007/021140 A 2/2007

OTHER PUBLICATIONS

International Search Report and Written Opinion issued Jul. 15, 2008.
"Solar Transit", Wikipedia, May 9, 2007, 2 pages, http://en.wikipedia.org/w/index.php?title=Solar_transit&printable=yes.
Public Radio Satellite System, "Solar Outages", Jun. 21, 2007, 2 Pages,http://www.prss.org/tech_support/solar_outages.cfm.
Public Radio Satellite System, "Spring Solar Outage Chart", Jun. 21, 2007, 2 pages, http://www.prss.org/tech_support/spring_so.cfm.
Public Radio Satellite System, "Fall Solar Outage Chart", Jun. 21, 2007, 3 pages, http://www.prss.org/tech_support/fall_so.cfm.
Kyle J. Way, "DirecTV® Indication of Possible Solar Outage", Jun. 21, 2007, 1 page.

* cited by examiner

*Primary Examiner* — Oschta Montoya
(74) *Attorney, Agent, or Firm* — Ingrassia Fisher & Lorenz, P.C.

(57) ABSTRACT

A method is presented for notifying a user of a broadcast communication channel problem. At a broadcast distribution facility, a problem involving a first broadcast communication channel from the broadcast distribution facility to a broadcast communication receiver associated with the user is detected. A cause of the problem is ascertained at the facility. The broadcast distribution facility then relays an indication of the cause of the problem to the receiver over a second broadcast communication channel from the facility to the receiver. The receiver informs the user of the cause of the problem.

34 Claims, 3 Drawing Sheets

USER NOTIFICATION OF BROADCAST COMMUNICATION CHANNEL PROBLEMS

BACKGROUND

Broadcast communication systems, such as direct broadcast satellite (DBS) systems, satellite radio (SR) broadcast systems, and cable television systems, have become exceedingly popular among consumers by providing convenient and relatively inexpensive access to numerous sources of programming, such as newscasts, sporting events, entertainment programs, and the like. Recent advances in quality and functionality, such as high-definition video programming and digital recording capability, have further enhanced the desirability of accessing such systems.

Additionally, programming over such broadcast communication systems is typically delivered to the user in a digital format, thus enhancing both the quality and reliability of the received content. In fact, the reliability of programming delivery on such systems has attained such a level that any interruption or disruption in the reception of programming often instills surprise, if not outright consternation, in the typical user. Such a problem may adversely affect the quality of one or more programming channels, and in extreme cases, may cause complete loss of one or more programs.

Such a problem may be caused by equipment errors or failure at any of a number of locations within the broadcast communication system, including communication devices located at the programming provider, the broadcast distribution facility, or the customer location. Also, environmental conditions, such as heavy rain or snow, may negatively impact program reception. Thus, in the event of a program disruption or outage, the user or consumer typically cannot or does not know the source or cause of the problem, and thus does not know if any actions on their part are required to restore service. At most, in the case of a lost programming supplier feed or similar problem within a DBS system, the programming supplier or the system provider may display a "slate," or static video image, acknowledging the problem, but otherwise providing little or no specific information. Thus, in the event of a problem with reception, the user typically attempts to contact a customer service representative at a call center of the system provider or operator to obtain more information regarding the problem. Unfortunately, if the problem affects a large number of the users subscribing to the same programming, the volume of calls typically prevents most of the users experiencing the same problem from obtaining the information they desire. Further, the large call volume at the call center may prevent other users with potentially more serious issues from successfully reaching the call center until the problem has been remedied.

DETAILED DESCRIPTION

Figure 1:
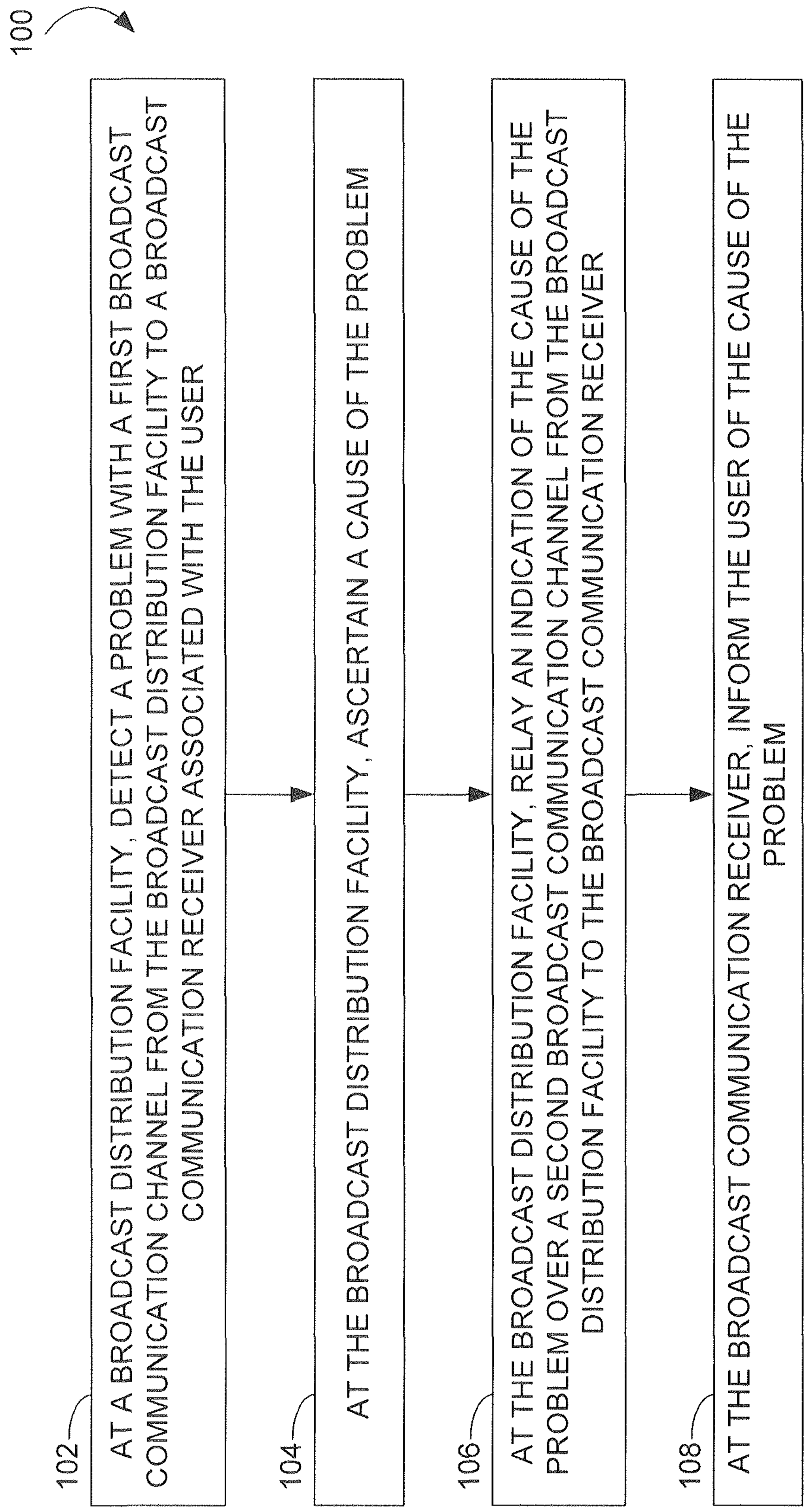
FIG. 1 is a flow diagram of a method according to an embodiment of the invention for notifying a user of broadcast communication channel problems.

FIG. 1 provides a flow diagram of a method 100 for notifying a user of broadcast communication channel problems according to one embodiment of the invention. In the method 100, a problem with a first broadcast communication channel from a broadcast distribution facility to a broadcast communication receiver associated with the user is detected at the broadcast communication facility (operation 102). A cause of the problem is then ascertained at the broadcast distribution facility (operation 104). The facility may learn of the cause from a source external to the facility, or the facility may itself determine the cause. An indication of the cause of the problem is then relayed over a second broadcast communication channel from the facility to the broadcast communication receiver (operation 106). The user is informed of the cause of the problem at the receiver (operation 108).

Figure 2:
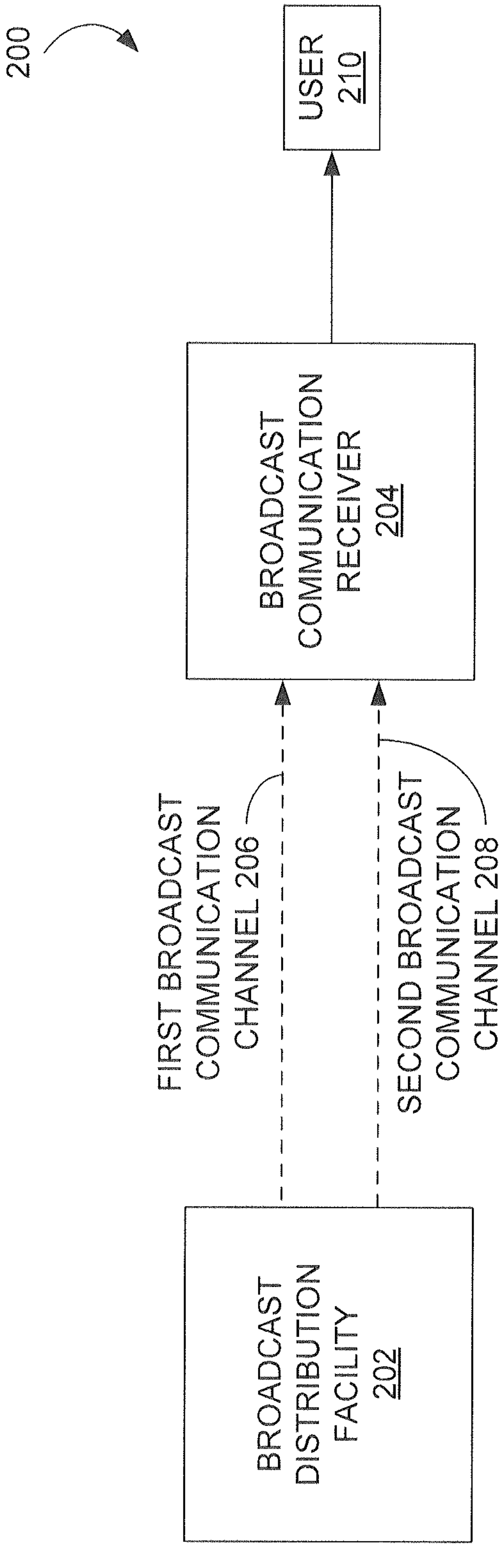
FIG. 2 is a block diagram of a broadcast communication system according to an embodiment of the invention that is capable of notifying a user of broadcast communication channel problems.

Another embodiment, a broadcast communication system 200, is depicted in FIG. 2. The system 200 includes a broadcast distribution facility 202 and a broadcast communication receiver 204 associated with a user 210. The broadcast distribution facility 202 is configured to detect a problem involving a first broadcast communication channel 206 from the facility 202 to a broadcast communication receiver 204, as well as ascertain a cause of the problem. The facility 202 may learn of the cause as determined externally to the facility 202, or the facility 202 may itself determine the cause. The facility 202 is also configured to relay an indication of the cause of the problem to the broadcast communication receiver 204 over a second broadcast communication channel 208 from the facility 202 to the receiver 204. The receiver 204 is configured to receive the indication of the cause of the problem and inform the user 210 of the cause of the problem. The broadcast distribution facility 202 and the broadcast communication receiver 204 each represent separate embodiments of the invention as well.

Figure 3:
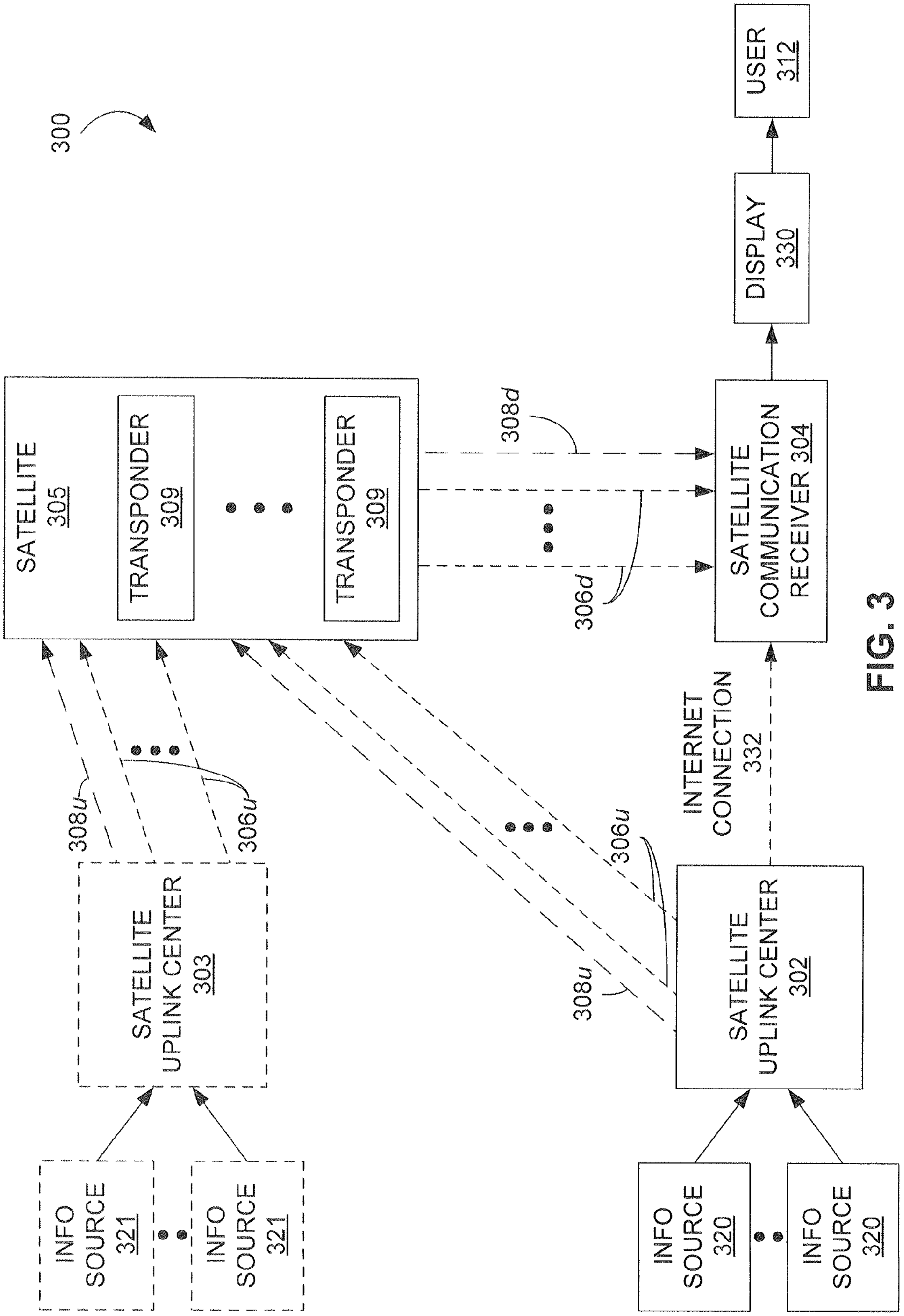
FIG. 3 is a block diagram of a broadcast communication system according to another embodiment of the invention that is capable of notifying a user of broadcast communication channel problems.

FIG. 3 illustrates a broadcast communication system 300 according to another embodiment of the invention. More specifically, the broadcast communication system 300 is a satellite broadcast communication system, such as a DBS system for broadcasting video and audio programming. Generally, the system 300 includes a satellite uplink center 302 operating as a broadcast distribution facility, a communication satellite 305, and a satellite communication receiver 304. Typically, many receivers 304 are present in the system 300, but only one receiver 304 is depicted explicitly in FIG. 3 to simplify the following discussion. One particular term often used for such a receiver 304 is a "set-top box," although other terms referencing the receiver 304 have also been utilized. Other possible components or sites constituting the system 300 are not shown to facilitate clarity in the discussion below.

While the following discussion focuses exclusively on embodiments of the invention within the context of satellite broadcast communications, equipment involved in the reception of other forms of communication, such as various types of wireline and wireless communication, may also benefit from application of the embodiments discussed below. For example, the broadcast communication system may instead be a satellite radio (SR) system, a cable broadcast system or a terrestrial broadcast communication system.

The satellite uplink center 302 typically receives programming from one or more external information sources 320, such as a programming content provider. Examples of content providers include television broadcasting networks, sports programming outlets, news providers, and other television programming suppliers. Audio-only content providers supplying music and other audio programming may be included.

The satellite uplink center 302 transfers the programming received from the information sources 320 over one or more satellite programming channels 306 to the satellite communication receiver 304 via the communication satellite 305.

More specifically, the satellite 305 includes one or more transponders 309 for receiving the programming over satellite programming uplink channels 306*u* and retransmitting the programming over satellite programming downlink channels 306*d* to the satellite communication receiver 304 associated with a user 310. In one embodiment, the satellite 305 includes 16 to 32 transponders, each of which may operate at a different transmission frequency and be capable of carrying up to twelve different programs simultaneously by way of time-division multiplexing (TDM). Each of the programs is associated with one of the satellite programming channels 306 mentioned above and discussed hereinafter.

The receiver 304 receives programming over each of the programming channels 306, typically by way of an antenna or "dish" (not shown in FIG. 3). The user 310 tunes the receiver 304 to select a particular program for viewing by way of a display 330, such as a television, monitor, or other device for viewing video and audio of the selected program. In one embodiment, the receiver 304 may include a second tuner for allowing the recording of one program while watching another, watching two programs simultaneously by way of picture-in-picture (PIP) functionality, or recording two programs simultaneously.

In one embodiment shown in FIG. 3, a second satellite uplink center 303 receiving programming from other information sources 321 may provide that programming to the satellite 305 for ultimate delivery to the receiver 304. In another implementation, the receiver 304 may also receive programming from a second satellite and separate uplink center (neither of which is shown in FIG. 3). Additionally, an Internet connection 332 may couple the receiver 304 with the first satellite uplink center 302 or other equipment of the broadcast communication system 300 of FIG. 3.

In operation, while programming is being transferred from the information source 320 to the satellite communication receiver 304 by way of the satellite uplink center 302 and the communication satellite 305, one or more of the programming channels 306 may encounter a problem from the perspective of the user 310. The problem may be a reduction in the audio or video quality of one of the programs being received at the receiver 304 over one of the channels 306, a partial or complete loss of data associated with one of the channels 306, or any other interruption or disruption of the program being transferred over the channel 306.

The source of a channel problem may be located in at least one of a number of locations within the broadcast communication system 300. For example, one of the information sources 320 or the connection between the source 320 and the uplink center 302 may experience a failure preventing the associated programming from reaching the uplink center 302. In another example, the uplink center 302 may be experiencing internal problems, such as with reception of the programming from the information source 320, or with transmission of the programming to the satellite 305. Similarly, one or more transponders 309 of the satellite 305 may experience difficulties in receiving the programming over the channels 306 from the uplink center 302, or transmitting the programming over the channels 306 to the receiver 304.

Other channel problems may not be related to the equipment employed in the broadcast communication system 300, but may instead be caused by adverse weather or other environmental conditions affecting the communication paths of the satellite programming channels 306. For example, heavy rain or snow conditions may negatively affect the path of the programming channels 306 between the uplink center 302 and the satellite 305, as well as the path between the satellite 305 and the receiver 304. Other atmospheric conditions, such as sun spot activity or backlighting of the satellite 305 by the sun, which may temporarily "blind" the receiver 304, may cause interruption or disruption of the programming channels 306 as well.

In the presence of a channel problem, the satellite uplink center 302 may detect the existence of the problem in a number of ways, depending on the source of the problem. In the case the problem resides in one of the information sources 320 or the connection between the source 320 and the uplink center 302, the uplink center 302 may independently deduce from the programming being received that the source of the problem lies prior to the uplink center 302. Alternatively, the affected information source 320 may transfer an explicit indication of the cause of the problem to the uplink center 302. If, instead, the source of the problem lies within the uplink center 302, the uplink center 302 may detect the problem and determine its cause by way of self-diagnostic hardware or firmware, or other means.

In another example, the problem may be caused within, but remain undetected by, the uplink center 302. Another source of failure may be the communication satellite 305, including one of its transponders 309. In either of these situations, the satellite uplink center 302 may detect the problem and its cause by way of a satellite communication link (not shown in FIG. 3) from the satellite 305 back to the uplink center 302, or by way of a "test receiver" (also not shown in FIG. 3) integrated within, or coupled with, the uplink center 302 and configured to test the presence and quality of one or more of the channels 306 transmitted from the satellite 305. In yet another implementation, a human operator may be able to enter the indication of the cause into the uplink center 302 manually.

Once the uplink center 302 has detected the problem and ascertained its cause, the uplink center 302 relays an indication of the cause of the problem to the receiver 304, as well as other receivers accepting programming from the satellite 305. In one example, the indication of the cause is transmitted from the uplink center 302 over a data channel 308 to the receiver 304 through a transponder 309 of the satellite 305. In the embodiment of FIG. 3, the data channel 308 is formed by way of a data uplink channel 308*u* from the uplink center 302 to the satellite 305, and a data downlink channel 308*d* from the satellite 305 to the receiver 304. The data channel 308 may be a separate channel from the programming channels 306, thus also possibly carrying subscription data, administrative data, technical data and the like, but no programming. In one embodiment, a number of data channels 308 are provided from the uplink center 302 to the receiver 304, with each data channel 308 being associated with, and transmitted by, each transponder 309 of the satellite 305. Further, the indication of the cause of the detected problem, along with data regarding other problems or status involving the programming channels 306 throughout the entire system 300, may be repeated indefinitely on each of the data channels 308 of each transponder 309 of each satellite 305 to ensure receipt by the receiver 304. Thus, such information is made available if one or more transponders 309, or even an entire satellite 305, are lost.

Some failures of the broadcast communication system 300, such as an error within some or all of the transponders 309 of one or more satellites 305, may prevent the indication of the cause of the detected problem from reaching the receiver 304 by way of the data channels 308. To address this potential issue, the Internet connection 332 from the uplink center 302 to the receiver 304 may be employed to transfer the indication of the cause of the problem to the receiver 304 by way of a terrestrial link, thus bypassing any errors or defects involving the satellite 305 or its transponders 309. Accordingly, if the receiver 304 detects the loss of a data channel 308 for a particular transponder 309, the receiver 304 may attempt to acquire information from a data channel 308 of another transponder 309 of the same or another satellite 305. If these attempts fail, the receiver may then look to a terrestrial link, such as the Internet connection 332 mentioned above, for the information.

In another example, some failures of the uplink center 302 may prohibit the uplink center 302 from transmitting an indication of the cause of the problem. In that case, the second uplink center 303 of FIG. 3 may receive that indication from another location of the broadcast communication system 300, such as a test receiver as described above, or one of the information sources 321 coupled with the second uplink enter 303. In one embodiment, a human operation may enter the indication of the cause of the problem manually into the second uplink center 303. The second uplink center 303 may then transmit the indication to the receiver over one or more data channels 308 via one or more of the transponders 309 of the satellite 305.

While some problems affecting reception of one or more broadcast programming channels 306 are current events which may only be detected after they occur, others may be future events which are predictable. For example, the sun may be positioned such that a satellite 305 may be backlit from the viewpoint of a receiver 304, as mentioned above, resulting in the loss of one or more programming channels 306 for a period of time. Such a phenomenon is predictable on the basis of the motion of the earth relative to the sun. As a result, information regarding the predicted failure may be provided over the data channels 308 of one or more satellites 305 so that the receivers 304 that will be impacted by the phenomenon may be alerted prior to the event. In this case, the receivers 304 to be affected during a particular time period may be identified by way of zip code or other geographical indication. Under another scenario, information concerning scheduled maintenance on a particular device within the system 300 that may cause temporary loss of programming may be relayed to the receivers 304 in a like manner.

Other information in addition to an indication of the cause of the channel problem may be generated at the uplink center 302 and forwarded to the receiver 304. This information may include, for example, an estimated time of resolution for the problem, which may help align the expectations of the user 310 with those of the technical personnel charged with resolving the problem.

In one embodiment, the receiver 304 continually monitors the one or more data channels 308 received from the satellite 305, and possibly other satellites, for problem information involving the programming channels 306. Alternatively, the receiver 304 may check for the problem information associated with a particular channel 306 if the receiver 304 is tuned to that channel 306. As discussed above, the receiver 304 may also receive the indication of the cause of a detected problem over the Internet connection 332.

The indication of the cause may be in the form of a code, such as an alphanumeric code or escape sequence, indicating one of a list of predefined potential problems. In that embodiment, the receiver 304 may translate the code into text or some other form perceivable by the user 310 by way of the display 330. In another implementation, the uplink center 302 may directly specify the text or other form to be presented to the user 310. The text may then be displayed for the user 320 when the user tunes the receiver 304 to the impacted channel 306. The indication of the cause of the problem may also be in the form of an audio message transferred from the receiver 304 to be played on the display 330 to the user 310 when tuned to the affected channel 306.

For example, presuming one of the information sources 320, associated with Network XYZ, is not able to transfer a particular program to the uplink center 302, the uplink center 302 may receive information from the source 320 indicating the cause of the problem and an estimated time for resolution. The uplink center 302 may then react to this information by causing text to be presented by the receiver 304 at the display 330 when the receiver 304 is tuned to Network XYZ to inform the user 310 of the problem. Such text may indicate that "Network XYZ is temporarily out of service due to a hardware problem at a Network XYZ facility. XYZ expects service to be restored by 10 P.M., Eastern Standard Time." The user 310, thus being informed of the cause of the problem, may not be inclined to call the call center of the operator or provider of the broadcast communication system 300, thus reducing the amount of call traffic at the call center.

The user 310 may also be updated as to any changes in the status of the problem. For example, in the scenario presented above, if the problem is not resolved by the quoted time, the expected time of resolution may be modified at the uplink center 302, transferred to the receiver 304 via the satellite 305, and displayed to the user 310 to apprise the user 310 of the change.

As described above, various embodiments of the present invention notify a user of a broadcast communication system of channel problems. Such problems may result from any of a number of equipment failures of the system, or from adverse environmental conditions affecting the system. By notifying the user by way of his associated broadcast communication receiver in a timely manner, call traffic at the call center of the entity operating the system can be greatly reduced, thus addressing the concerns, and potentially reducing the frustration, of the users impacted by the problem. The lower call center volume also allows call center representatives to be more effective in resolving other user issues.

Embodiments of the present invention may be embodied in electronic hardware, software, or some combination thereof located within the broadcast communication receivers and distribution facilities described above. Such software may include instructions executable by one or more processors located and operating within each of the receivers and distribution facilities discussed herein.

While several embodiments of the invention have been discussed herein, other embodiments encompassed by the scope of the invention are possible. For example, while some embodiments of the invention are described above in specific reference to satellite broadcast communications, other communication systems, devices, and methods involving other forms of communication, such as wireline, wireless, or optical communications, may benefit from application of the concepts described herein. For example, satellite radio (SR) communication systems may employ a text display commonly utilized for channel and program identification to relay problem cause and anticipated resolution information to the user. Also, aspects of one embodiment may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims.

What is claimed is:

1. A method for notifying a user of broadcast communication channel problems, the method comprising:

at a broadcast distribution facility, detecting a problem involving a first broadcast communication channel from the broadcast distribution facility to a broadcast communication receiver associated with the user, wherein the problem involving the first broadcast communication channel comprises one or more of environmental/meteorological interference or a broadcast equipment malfunction;

at the broadcast distribution facility, ascertaining a cause of the problem;

at the broadcast distribution facility, relaying an indication of the cause of the problem to the broadcast communication receiver over a second broadcast communication channel from the broadcast communication facility to the broadcast communication receiver; and at the broadcast communication receiver, informing the user of the cause of the problem, wherein the problem involving the first broadcast communication channel prevents the indication of the cause of the problem from being relayed to the broadcast communication receiver over the first broadcast communication channel;

wherein the broadcast distribution facility comprises a satellite uplink center;

the broadcast communication receiver comprises a satellite communication receiver;

the first broadcast communication channel from the satellite uplink center to the satellite communication receiver is routed through a communication satellite; and the first broadcast communication channel comprises one of a plurality of satellite programming channels from the satellite uplink center to the satellite communication receiver;

wherein the second broadcast communication channel comprises a data channel from the satellite uplink center to the satellite communication receiver that is routed through the communication satellite and is separate from the plurality of satellite programming channels.

2. The method of claim 1, further comprising:

at a second broadcast distribution facility, relaying the indication of the cause of the problem to the broadcast communication receiver over a third broadcast communication channel from the second broadcast communication facility to the broadcast communication receiver.

3. The method of claim 1, wherein:

the indication of the cause of the problem comprises a code; and the method further comprises at the broadcast communication receiver, translating the code into a form understandable by the user.

4. The method of claim 1, further comprising:

at the broadcast distribution facility, ascertaining an estimated time for resolution of the problem;

at the broadcast distribution facility, relaying an indication of the estimated time for resolution of the problem to the broadcast communication receiver over the second broadcast communication channel; and at the broadcast communication receiver, informing the user of the estimated time for resolution of the problem.

5. The method of claim 1, further comprising:

at the broadcast distribution facility, receiving the indication of the cause of the problem from a supplier of information intended for transmission over the first broadcast communication channel.

6. The method of claim 1, further comprising:

if relaying the indication of the cause of the problem to the broadcast communication receiver over the second broadcast communication channel fails, relaying the indication of the cause of the problem to the broadcast communication receiver via an Internet connection.

7. The method of claim 1, wherein informing the user of the indication of the cause of the problem comprises displaying the indication of the cause of the problem when the broadcast communication receiver is tuned to the first broadcast communication channel.

8. The method of claim 1, wherein the problem comprises one of a current event and a future event.

9. The method of claim 1, wherein the cause of the problem comprises at least one of a failure of the communication satellite, a failure of the satellite uplink center, a failure of an information source supplying information for the first broadcast communication channel to the satellite uplink center, and an adversely-affected communication path of the first broadcast communication channel.

10. The method of claim 1, wherein relaying the indication of the cause of the problem to the broadcast communication receiver occurs over a data channel of each of a plurality of transponders of the communication satellite.

11. The method of claim 10, wherein relaying the indication of the cause of the problem to the broadcast communication receiver also occurs over a data channel of each of a plurality of transponders of a second communication satellite.

12. A broadcast communication system capable of notifying a user of broadcast communication channel problems, the broadcast communication system comprising:

a broadcast distribution facility; and a broadcast communication receiver associated with the user;

wherein the broadcast distribution facility is configured to detect a problem involving a first broadcast communication channel from the broadcast distribution facility to the broadcast communication receiver, ascertain a cause of the problem, and relay an indication of the cause of the problem to the broadcast communication receiver over a second broadcast communication channel from the broadcast communication facility to the broadcast communication receiver, wherein the problem involving the first broadcast communication channel comprises one or more of environmental/meteorological interference or a broadcast equipment malfunction; and wherein the broadcast communication receiver is configured to receive the indication of the cause of the problem and inform the user of the cause of the problem and the problem involving the first broadcast communication channel prevents the indication of the cause of the problem from being relayed to the broadcast communication receiver over the first broadcast communication channel;

wherein the system further comprises a communication satellite;

the broadcast distribution facility comprises a satellite uplink center;

the broadcast communication receiver comprises a satellite communication receiver;

the first broadcast communication channel from the satellite uplink center to the satellite communication receiver is routed through the communication satellite; and the first broadcast communication channel comprises one of a plurality of satellite programming channels from the satellite uplink center to the satellite communication receiver;

wherein the second broadcast communication channel comprises a data channel from the satellite uplink center to the satellite communication receiver that is routed through the communication satellite and is separate from the plurality of satellite programming channels.

13. The broadcast communication system of claim 12, further comprising a second broadcast distribution facility configured to relay the indication of the cause of the problem to the broadcast communication receiver over a third broadcast communication channel from the second broadcast communication facility to the broadcast communication receiver.

14. The broadcast communication system of claim 12, wherein:

the indication of the cause of the problem comprises a code; and the broadcast communication receiver is configured to translate the code into a form understandable by the user.

15. The broadcast communication system of claim 12, wherein:

the broadcast distribution facility is further configured to ascertain an estimated time for resolution of the problem and relay an indication of the estimated time for resolution of the problem to the broadcast communication receiver over the second broadcast communication channel; and the broadcast communication receiver is further configured to receive the indication of the estimated time for resolution of the problem and inform the user of the estimated time for resolution of the problem.

16. The broadcast communication system of claim 12, wherein the broadcast communication facility is further configured to receive the indication of the cause of the problem from a supplier of information intended for transmission over the first broadcast communication channel.

17. The broadcast communication system of claim 12, wherein the broadcast communication facility is further configured to relay the indication of the cause of the problem to the broadcast communication receiver via an Internet connection if relaying the indication of the cause of the problem to the broadcast communication receiver is not possible over the second broadcast communication channel.

18. The broadcast communication system of claim 12, wherein the broadcast communication receiver is configured to inform the user of the indication of the cause of the problem by displaying the indication of the cause of the problem when the broadcast communication receiver is tuned to the first broadcast communication channel.

19. The broadcast communication system of claim 12, wherein the problem comprises one of a current event and a future event.

20. The broadcast communication system of claim 12, wherein the cause of the problem comprises at least one of a failure of the communication satellite, a failure of the satellite uplink center, a failure of an information source supplying information for the first broadcast communication channel to the satellite uplink center, and an adversely-affected communication path of the first broadcast communication channel.

21. The broadcast communication system of claim 12, wherein the communication satellite comprises a plurality of transponders, wherein each transponder is configured to relay the indication of the cause of the problem to the broadcast communication receiver by way of a separate data channel.

22. The broadcast communication system of claim 12, further comprising a second communication satellite comprising a plurality of transponders, wherein each transponder is configured to relay the indication of the cause of the problem to the broadcast communication receiver by way of a separate data channel.

23. A broadcast distribution facility capable of notifying a user of broadcast communication channel problems, the broadcast distribution facility being configured to detect a problem involving a first broadcast communication channel from the broadcast distribution facility to a broadcast communication receiver associated with the user, ascertain a cause of the problem, and relay an indication of the cause of the problem to the broadcast communication receiver over a second broadcast communication channel from the broadcast communication facility to the broadcast communication receiver, wherein the problem involving the first broadcast communication channel comprises one or more of environmental/meteorological interference or a broadcast equipment malfunction, wherein the problem involving the first broadcast communication channel prevents the indication of the cause of the problem from being relayed to the broadcast communication receiver over the first broadcast communication channel;

wherein the broadcast distribution facility comprises a satellite uplink center;

wherein the second broadcast communication channel comprises a data channel from the satellite uplink center to a satellite communication receiver that is routed through a communication satellite.

24. The broadcast distribution facility of claim 23, wherein the broadcast distribution facility is further configured to ascertain an estimated time for resolution of the problem and relay an indication of the estimated time for resolution of the problem to the broadcast communication receiver over the second broadcast communication channel.

25. The broadcast distribution facility of claim 23, further configured to receive the indication of the cause of the problem from a supplier of information intended for transmission over the first broadcast communication channel.

26. The broadcast distribution facility of claim 23, further configured to relay the indication of the cause of the problem to the broadcast communication receiver via an Internet connection if relaying the indication of the cause of the problem to the broadcast communication receiver is not possible over the second broadcast communication channel.

27. The broadcast distribution facility of claim 23, wherein the problem comprises one of a current event and a future event.

28. A broadcast communication receiver capable of notifying a user of broadcast communication channel problems, the broadcast communication receiver being configured to receive an indication of a cause of a problem involving a first broadcast communication channel from a broadcast distribution facility to the broadcast communication receiver, wherein the problem involving the first broadcast communication channel comprises one or more of environmental/meteorological interference or a broadcast equipment malfunction, wherein the indication of the cause is received over a second broadcast communication channel from the broadcast distribution facility to the broadcast communication receiver, and inform the user of the cause of the problem further wherein the problem involving the first broadcast communication channel prevents the indication of the cause of the problem from being received by the broadcast communication receiver over the first broadcast communication channel;

wherein the broadcast communication receiver comprises a satellite communication receiver; further configured to receive the indication of the cause of the problem over a data channel of a transponder of a first communication satellite.

29. The broadcast communication receiver of claim 28, wherein:

the indication of the cause of the problem comprises a code; and the broadcast communication receiver is configured to translate the code into a form understandable by the user.

30. The broadcast communication receiver of claim 28, further configured to receive the indication of the estimated time for resolution of the problem and inform the user of the estimated time for resolution of the problem.

31. The broadcast communication receiver of claim 28, further configured to receive the indication of the cause of the problem via an Internet connection if receiving the indication of the cause of the problem is not possible over the second broadcast communication channel.

32. The broadcast communication receiver of claim 28, further configured to inform the user of the indication of the cause of the problem by displaying the indication of the cause of the problem when the broadcast communication receiver is tuned to the first broadcast communication channel.

33. The broadcast communication receiver of claim 28, wherein the problem comprises one of a current event and a future event.

34. The broadcast communication receiver of claim 28, further configured to receive the indication of the cause of the problem over a data channel of another transponder of the first communication satellite, or over a data channel of a transponder of a second communication satellite, if the data channel of the transponder of the first communication satellite is unavailable.

* * * * *